United States Patent
Park et al.

(10) Patent No.: US 12,534,135 B2
(45) Date of Patent: Jan. 27, 2026

(54) FRONT STRUCTURE OF VEHICLE BODY

(71) Applicants: HYUNDAI MOTOR COMPANY, Seoul (KR); Kia Corporation, Seoul (KR)

(72) Inventors: Taeou Park, Seoul (KR); Seongwook Seo, Hwaseong-si (KR); Mun Soo Cha, Suwon-si (KR); Heeju Kim, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 492 days.

(21) Appl. No.: 17/983,857

(22) Filed: Nov. 9, 2022

(65) Prior Publication Data

US 2023/0174159 A1   Jun. 8, 2023

(30) Foreign Application Priority Data

Dec. 7, 2021 (KR) .................. 10-2021-0174064

(51) Int. Cl.
*B62D 21/15* (2006.01)
*B60R 19/24* (2006.01)
*B60R 19/48* (2006.01)
*B62D 25/08* (2006.01)

(52) U.S. Cl.
CPC ............ *B62D 21/152* (2013.01); *B60R 19/24* (2013.01); *B60R 19/48* (2013.01); *B62D 25/08* (2013.01); *B62D 25/088* (2013.01)

(58) Field of Classification Search
CPC .... B62D 21/152; B62D 25/08; B62D 25/082; B62D 25/088
See application file for complete search history.

(56) References Cited

U.S. PATENT DOCUMENTS

| | | | | |
|---|---|---|---|---|
| 6,193,273 | B1* | 2/2001 | Novak | B62D 21/00 280/781 |
| 6,332,642 | B1* | 12/2001 | Hanyu | B62D 25/082 296/203.02 |
| 9,145,172 | B2* | 9/2015 | Bae | B62D 25/08 |
| 9,868,471 | B2* | 1/2018 | An | B62D 25/088 |
| 12,187,345 | B1* | 1/2025 | Hennessey | B62D 25/088 |
| 2008/0079290 | A1* | 4/2008 | Li | B62D 29/043 296/203.02 |
| 2013/0134742 | A1* | 5/2013 | Mildner | B62D 25/088 296/203.02 |
| 2015/0290989 | A1* | 10/2015 | Kim | B62D 25/088 280/124.1 |
| 2016/0107593 | A1* | 4/2016 | Park | B60R 19/24 296/198 |
| 2016/0244103 | A1* | 8/2016 | Amemiya | B62D 21/00 |
| 2016/0264176 | A1* | 9/2016 | Balzer | B62D 21/11 |
| 2019/0047632 | A1* | 2/2019 | Kim | B60G 13/003 |
| 2019/0161126 | A1* | 5/2019 | Dettling | B62D 29/008 |
| 2020/0086927 | A1* | 3/2020 | Watanabe | B62D 25/088 |

(Continued)

*Primary Examiner* — Gregory A Blankenship
(74) *Attorney, Agent, or Firm* — MORGAN, LEWIS & BOCKIUS LLP

(57) ABSTRACT

A front vehicle body structure includes a fender apron upper member, a shock absorber housing disposed under the fender apron upper member, and a front side member disposed under the shock absorber housing, and the fender apron upper member, the shock absorber housing and the front side member are integrally formed.

18 Claims, 11 Drawing Sheets

(56) References Cited

U.S. PATENT DOCUMENTS

| | | | |
|---|---|---|---|
| 2020/0180700 A1* | 6/2020 | Kim | B62D 27/02 |
| 2021/0114665 A1* | 4/2021 | Hong | B62D 21/11 |
| 2021/0114666 A1* | 4/2021 | Tashiro | B62D 25/08 |
| 2021/0179178 A1* | 6/2021 | Jeong | B62D 27/06 |
| 2021/0237800 A1* | 8/2021 | Kirita | B62D 21/02 |
| 2021/0253172 A1* | 8/2021 | Shimoda | B62D 21/152 |
| 2022/0048570 A1* | 2/2022 | Kim | B62D 21/155 |
| 2022/0194474 A1* | 6/2022 | Kim | B62D 25/14 |
| 2023/0174159 A1* | 6/2023 | Park | B60R 19/48 |
| | | | 296/187.09 |
| 2023/0211825 A1* | 7/2023 | Park | B62D 29/008 |
| | | | 296/193.09 |
| 2024/0375724 A1* | 11/2024 | Pinsonneault | B62D 25/087 |

* cited by examiner

FRONT STRUCTURE OF VEHICLE BODY

CROSS-REFERENCE TO RELATED APPLICATION

The present application claims priority to Korean Patent Application No. 10-2021-0174064 filed on Dec. 7, 2021, the entire contents of which is incorporated herein for all purposes by this reference.

BACKGROUND OF THE PRESENT DISCLOSURE

Field of the Present Disclosure

The present disclosure relates to a front vehicle body structure. More particularly, the present disclosure relates to a front vehicle body structure capable of minimizing a number of parts and securing strength.

Description of Related Art

The front structure of the vehicle body is an important skeletal longitudinal member of the vehicle body and is a major factor determining the basic strength of the vehicle body.

The front structure of the vehicle body protects the occupant in case of a frontal collision of the vehicle, supports powertrain portions, chassis portions, such as suspension and steering, a front bumper beam and a Front End module (FEM), a battery in front of the vehicle body etc.

Most mass-produced vehicles are designed and produced in a monocoque method of welding and joining steel panels.

A typical monocoque front apron member structure has problems in that more than 70 steel panels must be produced and assembled individually, so mold cost is burdened, the manufacturing process is complicated, and production cycle time is required.

This method may be suitable for the development of a mass production vehicle type, for example, more than about 100,000 vehicles per year, but it is difficult to apply to the development of a small production vehicle type, for example, less than about 1,000 vehicles per year.

When an 'aluminum space frame' structure suitable for small-volume production is applied, the layout of parts such as the shock absorber housing becomes complicated, and when high-vacuum die-casting parts are applied, the investment cost is high.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a front vehicle body structure configured for minimizing the number of parts and securing strength.

A front vehicle body structure according to various exemplary embodiments of the present disclosure may include a fender apron upper member, a shock absorber housing disposed under the fender apron upper member, and a front side member disposed under the shock absorber housing, and the fender apron upper member, the shock absorber housing and the front side member are integrally formed.

The fender apron upper member, the shock absorber housing and the front side member may be formed of aluminum material, and the fender apron upper member, the shock absorber housing and the front side member may be formed in a hollow shape.

The shock absorber housing may include a mounting upper connection connected to the fender apron upper member, a mounting lower connection connected to the front side member, and a shock absorber mounting portion connected to the mounting upper connection and the mounting lower connection and of which a shock absorber mounting hole may formed thereto.

The shock absorber housing may further include a mounting portion upper reinforcement rib integrally formed around the shock absorber mounting hole connecting the mounting upper connection and the shock absorber mounting portion.

The fender apron upper member may include a fender apron reinforcement rib integrally formed inside the fender apron upper member to be connected to the mounting portion upper reinforcement rib.

The shock absorber housing may further include a mounting portion lower reinforcement rib connecting the mounting lower connection and the shock absorber mounting portion and formed around the shock absorber mounting hole.

The front vehicle body structure according to various exemplary embodiments of the present disclosure may further include an inclined connection extending from the fender apron upper member to the front side member and integrally protruding around the shock absorber mounting portion.

The front vehicle body structure according to various exemplary embodiments of the present disclosure may further include an inclined connection hollow side integrally formed inside the inclined connection to form an inclined connection closed cross-section.

The front vehicle body structure according to various exemplary embodiments of the present disclosure may further include an inclined connection reinforcement rib formed in the direction of the front side member from the fender apron upper member inside the inclined connection.

The front vehicle body structure according to various exemplary embodiments of the present disclosure may further include a strut bar mounting portion integrally formed on the inclined connection.

The front side member may include a cabin mounting lower portion integrally formed at a rear thereof.

The front side member may include a suspension arm mounting portion formed integrally with an inside concave.

The front vehicle body structure according to various exemplary embodiments of the present disclosure may further include a suspension arm mounting portion reinforcement rib integrally formed inside the front side member adjacent to the suspension arm mounting portion.

The front side member may further include a powertrain mounting portion integrally formed thereto.

The front vehicle body structure according to various exemplary embodiments of the present disclosure may further include a powertrain mounting reinforcement rib integrally formed inside the front side member adjacent to the powertrain mounting portion.

The front side member may include an integrally formed sub-frame mounting portion concave inwardly.

The front vehicle body structure according to various exemplary embodiments of the present disclosure may further include a sub-frame mounting reinforcement rib integrally formed inside the front side member adjacent to the sub-frame mounting portion.

The front vehicle body structure according to various exemplary embodiments of the present disclosure may further include a front side member front mounting portion integrally formed in front of the front side member.

The front vehicle body structure according to various exemplary embodiments of the present disclosure may further include a front member connected to the front side member front mounting portion, and a bolt hole may be formed in the front member, and a notch hole smaller than the bolt hole may be formed in front of the bolt hole.

The fender apron upper member may include a fender apron upper front member mounting portion integrally formed in front thereof, and a cabin mounting upper portion integrally formed in a rear thereof.

According to the front vehicle body structure according to various exemplary embodiments of the present disclosure, it is possible to minimize the number of parts.

According to the front vehicle body structure according to various exemplary embodiments of the present disclosure, it is possible to secure cost competitiveness of a small-volume production vehicle type by use of a sand mold casting method.

According to the front vehicle body structure according to various exemplary embodiments of the present disclosure, it is possible to implement a predetermined strength vehicle body structure.

Furthermore, according to the front vehicle body structure according to various exemplary embodiments of the present disclosure, it is possible to minimize the assemble connection structure between parts and simultaneously assemble several peripheral parts, and to simplify the layout.

Furthermore, the effects obtainable or predicted by the exemplary embodiments of the present disclosure are to be included directly or implicitly in the detailed description of the exemplary embodiments of the present disclosure. That is, various effects predicted according to various exemplary embodiments of the present disclosure will be included in the detailed description to be described later.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
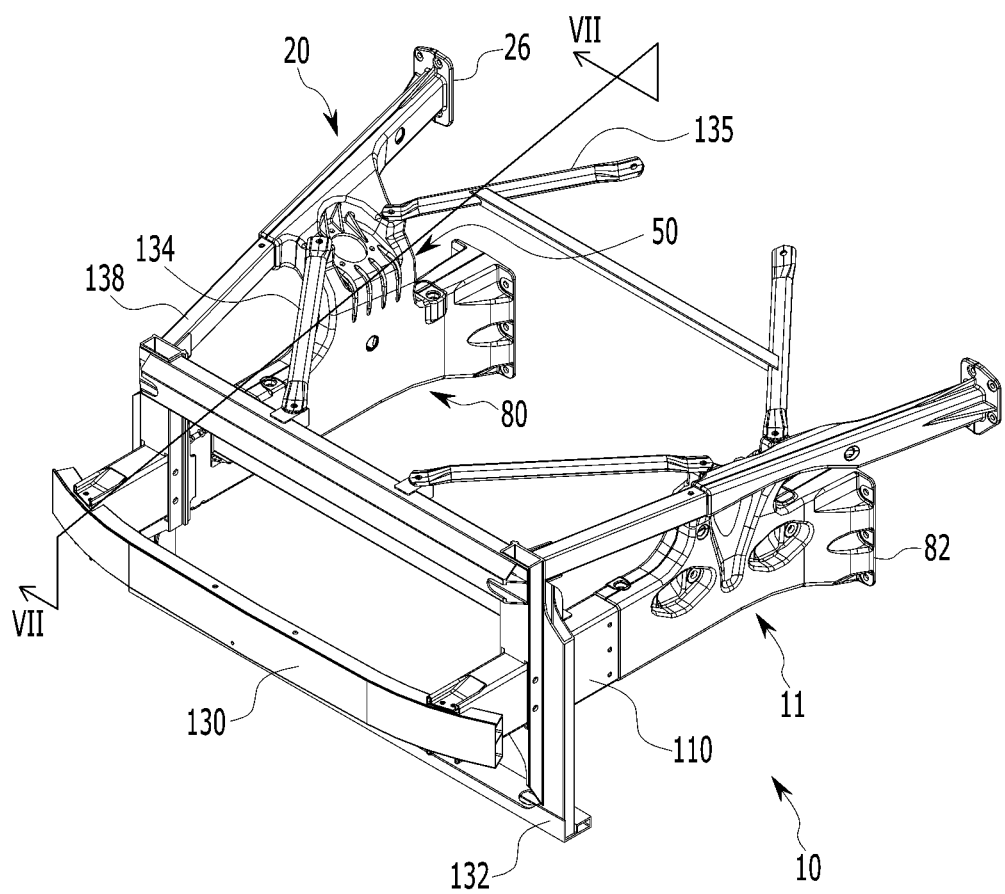
FIG. 1 is a partial perspective view of a front vehicle body structure according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown.

As those skilled in the art would realize, the described embodiments may be modified in various different ways, all without departing from the spirit or scope of the present disclosure.

To clearly describe the present disclosure, parts irrelevant to the description are omitted, and a same reference numerals are assigned to a same or similar elements throughout the specification.

Because the size and thickness of each component shown in the drawings are arbitrarily indicated for convenience of description, the present disclosure is not necessarily limited to that shown in the drawings, and the thickness is enlarged to clearly express various portions and regions.

Furthermore, in the following detailed description, the names of the components are divided into first, second, and the like to distinguish them in a same relationship, and the order is not necessarily limited in the following description.

Throughout the specification, when a part includes a predetermined component, it means that other components may be further included, rather than excluding other components, unless otherwise stated.

Furthermore, terms such as . . . part, . . . means described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

Various exemplary embodiments of the present disclosure will hereinafter be described in detail with reference to the accompanying drawings.

Figure 2:
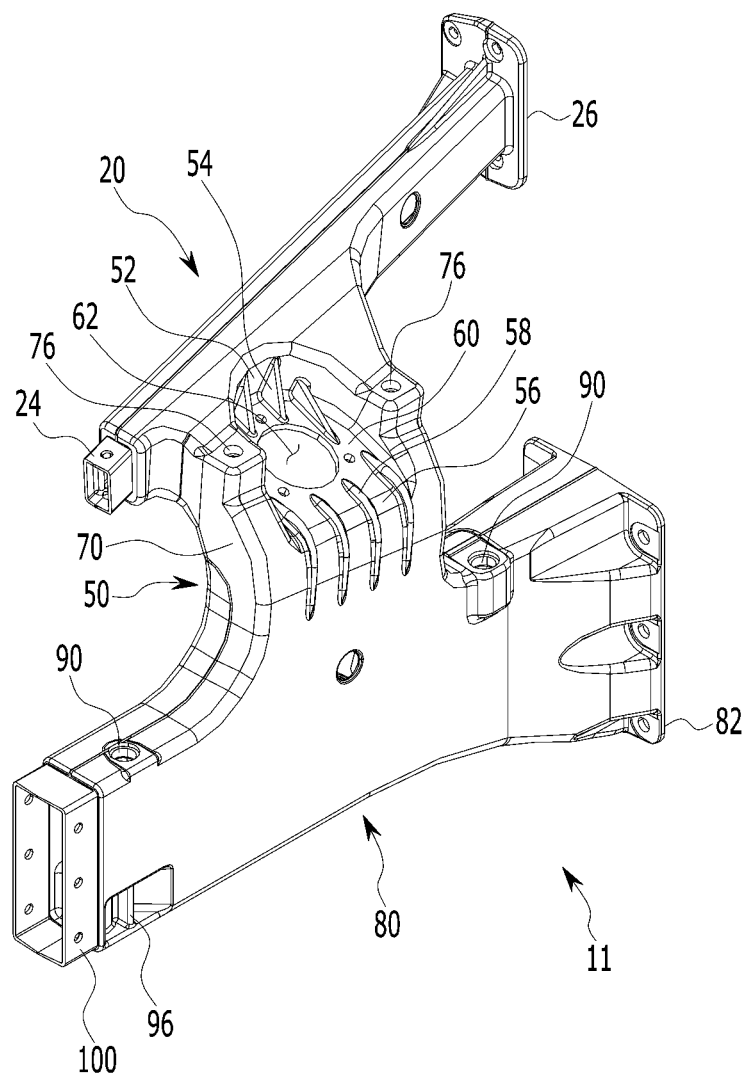
FIG. 2 is a perspective view of an integral structure which may be applied to the front vehicle body structure according to various exemplary embodiments of the present disclosure.

FIG. 1 is a partial perspective view of a front vehicle body structure according to various exemplary embodiments of the present disclosure, and FIG. 2 is a perspective view of an integral structure which may be applied to the front vehicle body structure according to various exemplary embodiments of the present disclosure.

Referring to FIG. 1 and FIG. 2, a front vehicle body structure 10 according to various exemplary embodiments of the present disclosure may include a fender apron upper member 20, a shock absorber housing 50 disposed under the fender apron upper member 20, and a front side member 80 disposed under the shock absorber housing 50.

The fender apron upper member 20, the shock absorber housing 50 and the front side member 80 may be integrally formed.

For better comprehension, the fender apron upper member 20, the shock absorber housing 50 and the front side member 80 integrally formed portions are referred to as one-piece structure 11.

For example, the fender apron upper member 20, the shock absorber housing 50 and the front side member 80, that is, the one-piece structure 11 may be formed by sand mold casting.

A typical monocoque front apron member structure has problems in that more than 70 steel panels must be produced and assembled individually, so mold cost is burdened, the manufacturing process is complicated, and production cycle time is required.

This method may be suitable for the development of a mass production vehicle type, for example, more than about 100,000 vehicles per year, but it is difficult to apply to the development of a small production vehicle type, for example, less than about 1,000 vehicles per year.

When an 'aluminum space frame' structure suitable for small-volume production is applied, the layout of parts such as the shock absorber housing becomes complicated, and when high vacuum die-casting parts are applied, the investment cost is high.

The fender apron upper member 20, the shock absorber housing 50 and the front side member 80, that is, the one-piece structure 11 may be formed of an aluminum material, through which it is possible to reduce the weight of the vehicle body.

The one-piece structure 11 may be formed as a hollow.

That is, the fender apron upper member 20, the shock absorber housing 50 and the front side member 80 are formed in a hollow shape, so that it is possible to reduce the weight of the vehicle body and increase the strength of the vehicle body.

Figure 3:
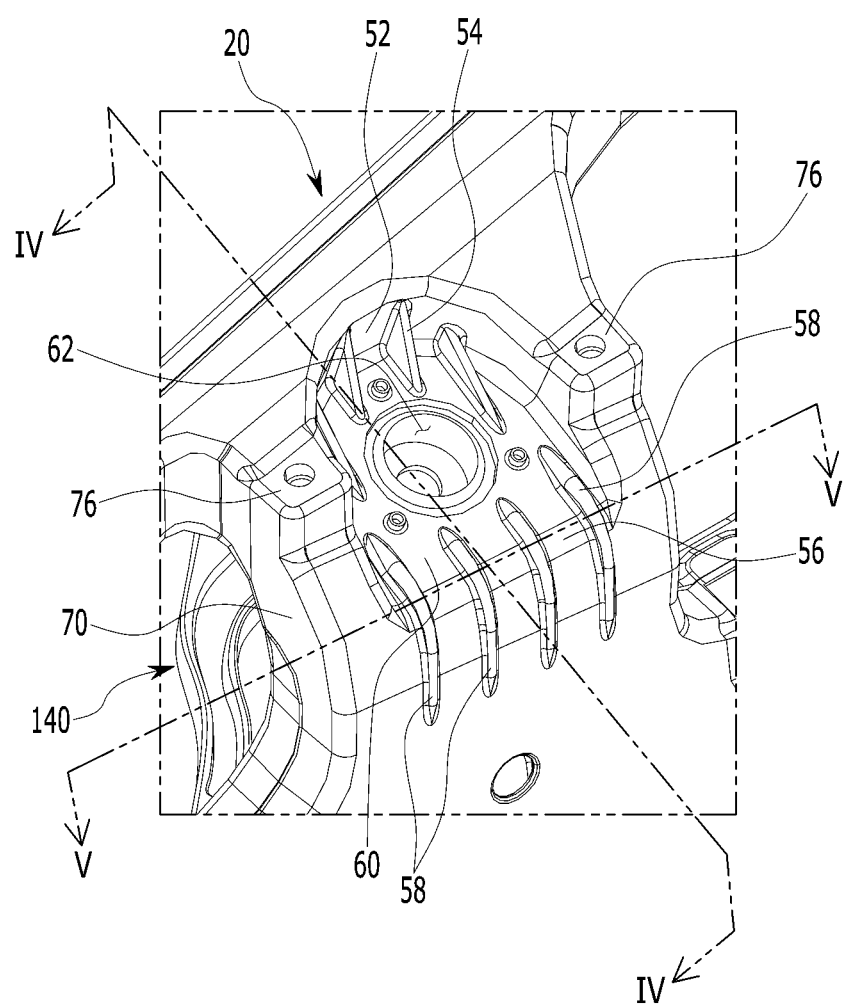
FIG. 3 is a partial perspective view showing a shock absorber housing of the front vehicle body structure according to various exemplary embodiments of the present disclosure.
Figure 4:
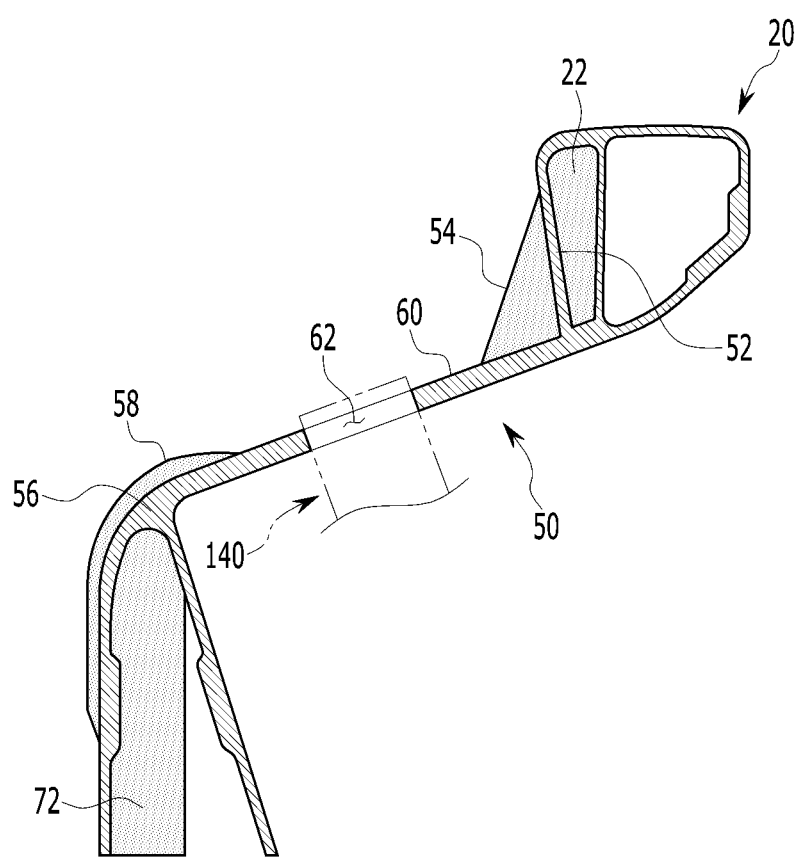
FIG. 4 is a cross-sectional view along the VI-VI line of FIG. 3.

FIG. 3 is a partial perspective view showing a shock absorber housing of the front vehicle body structure according to various exemplary embodiments of the present disclosure, and FIG. 4 is a cross-sectional view along the VI-VI line of FIG. 3.

Referring to FIG. 1 to FIG. 5, the shock absorber housing 50 may include a mounting upper connection 52 connected to the fender apron upper member 20, a mounting lower connection 56 connected to the front side member 80, and a shock absorber mounting portion 60 connected to the mounting upper connection 52 and the mounting lower connection 56 and of which a shock absorber mounting hole 62 is formed thereto.

The shock absorber housing 50 may further include a mounting portion upper reinforcement rib 54 integrally formed around the shock absorber mounting hole 62 connecting the mounting upper connection 52 and the shock absorber mounting portion 60.

The fender apron upper member 20 may include a fender apron reinforcement rib 22 integrally formed inside the fender apron upper member 20 to be connected to the mounting portion upper reinforcement rib 54.

As shown in FIG. 4, the mounting portion upper reinforcement rib 54 and the fender apron reinforcement rib 22 are connected through the mounting upper connection 52, and may reinforce around the shock absorber mounting hole 62.

It is also possible to secure the connection strength of the fender apron upper member 20 and the shock absorber housing 50.

The shock absorber housing 50 may further include a mounting portion lower reinforcement rib 58 that connects the mounting lower connection 56 and the shock absorber mounting portion 60 and formed around the shock absorber mounting hole 62.

The mounting portion lower reinforcement rib 58 may be integrally formed on the portion connecting the shock absorber housing 50 and the mounting lower connection 56.

The front vehicle body structure 10 according to various exemplary embodiments of the present disclosure may further include an inclined connection 70 extending from the fender apron upper member 20 to the front side member 80 and integrally protrude around the shock absorber mounting portion 60.

The strength of the shock absorber mounting portion 60 is strengthened by the protrude shape of the inclined connection 70, and the connection strength between the fender apron upper member 20 and the front side member 80 may be secured.

Referring to FIG. 3, a portion of the shock absorber 140 may be inserted into the shock absorber mounting hole 62 and connected to the shock absorber mounting portion 60 without a separate bracket, etc.

Because the mounting portion upper reinforcement rib 54, the mounting portion lower reinforcement rib 58, the fender apron reinforcement rib 22 and the inclined connection 70 are formed near to the shock absorber mounting hole 62, it is possible to secure the strength against the road load transmitted from the shock absorber 140.

The front vehicle body structure 10 according to various exemplary embodiments of the present disclosure may further include an inclined connection hollow side 72 integrally formed inside the inclined connection 70 to form an inclined connection closed cross-section 71.

Figure 5:
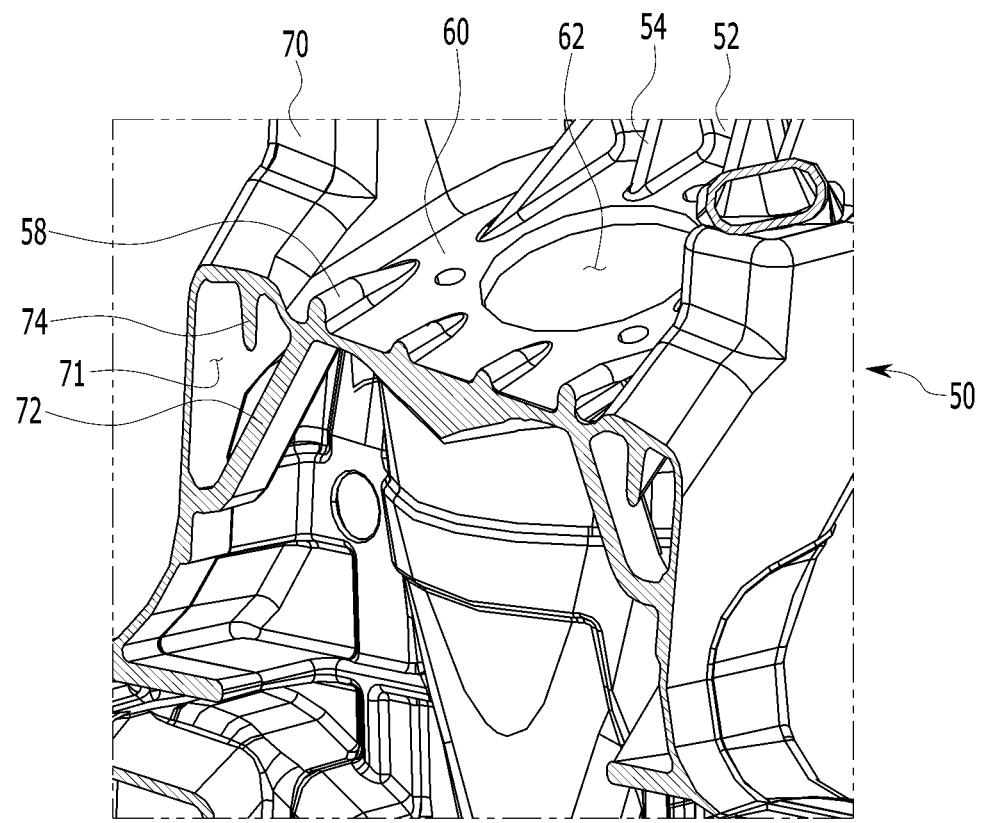
FIG. 5 is a cross-sectional view along the V-V line of FIG. 3.

That is, as shown in FIG. 5, the inclined connection hollow side 72 is formed inside the inclined connection 70 to secure the strength of the inclined connection 70.

Also, the inclined connection hollow side 72 may increase the connection strength of the shock absorber mounting portion 60 and the inclined connection 70.

The front vehicle body structure 10 according to various exemplary embodiments of the present disclosure may further include an inclined connection reinforcement rib 74 formed in the direction of the front side member 80 from the fender apron upper member 20 inside the inclined connection 70.

The inclined connection reinforcement rib 74 may increase the strength of the inclined connection 70, and may also increase the connection strength of the fender apron upper member 20 and the front side member 80.

On the inclined connection 70, a strut bar mounting portion 76 may be integrally formed.

The strut bar mounting portion 76 is integrally formed on the inclined connection 70, so that strut bars 134 and 135 may be mounted to the strut bar mounting portion 76 without a separate mounting bracket, etc.

Therefore, the number of parts and weight of the front vehicle body structure 10 may be reduced.

Referring to FIG. 1 and FIG. 2, the fender apron upper member 20 may include a fender apron upper front member mounting portion 24 integrally formed in front thereof and a cabin mounting upper portion 26 integrally formed in a rear thereof.

Because the fender apron upper front member 138 may be mounted on the fender apron upper front member mounting portion 24 without a separate mounting bracket, etc., the number of parts of the front vehicle body structure 10 may be reduced and the entire weight may be reduced.

Furthermore, the number of parts and weight of the front vehicle body structure 10 may be reduced because the vehicle body cabin or dash panel may be easily mounted on the cabin mounting upper portion 26 without a separate mounting bracket.

Figure 6:
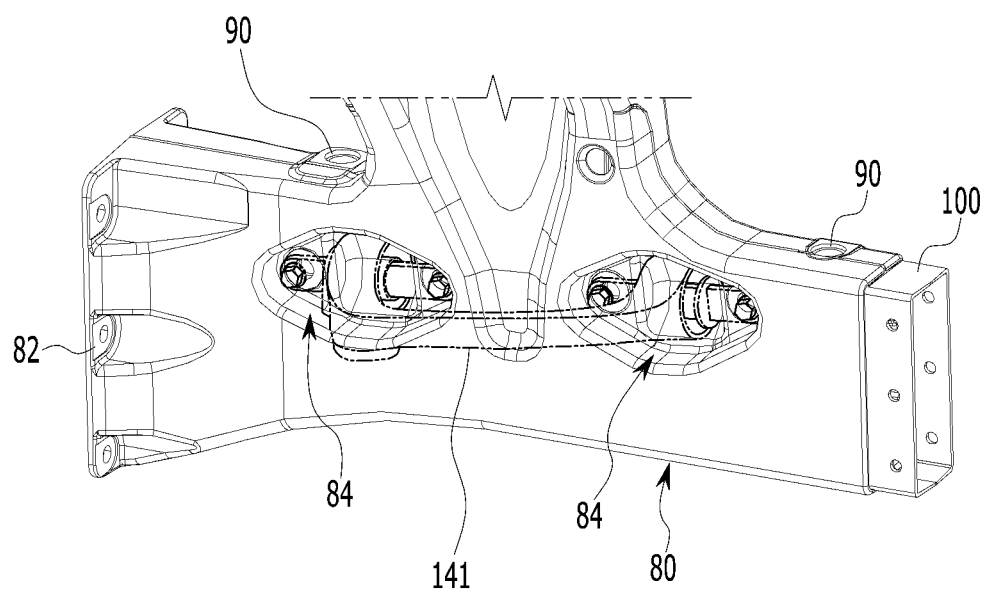
FIG. 6 is a perspective view showing a front side member of the front vehicle body structure according to various exemplary embodiments of the present disclosure.
Figure 7:
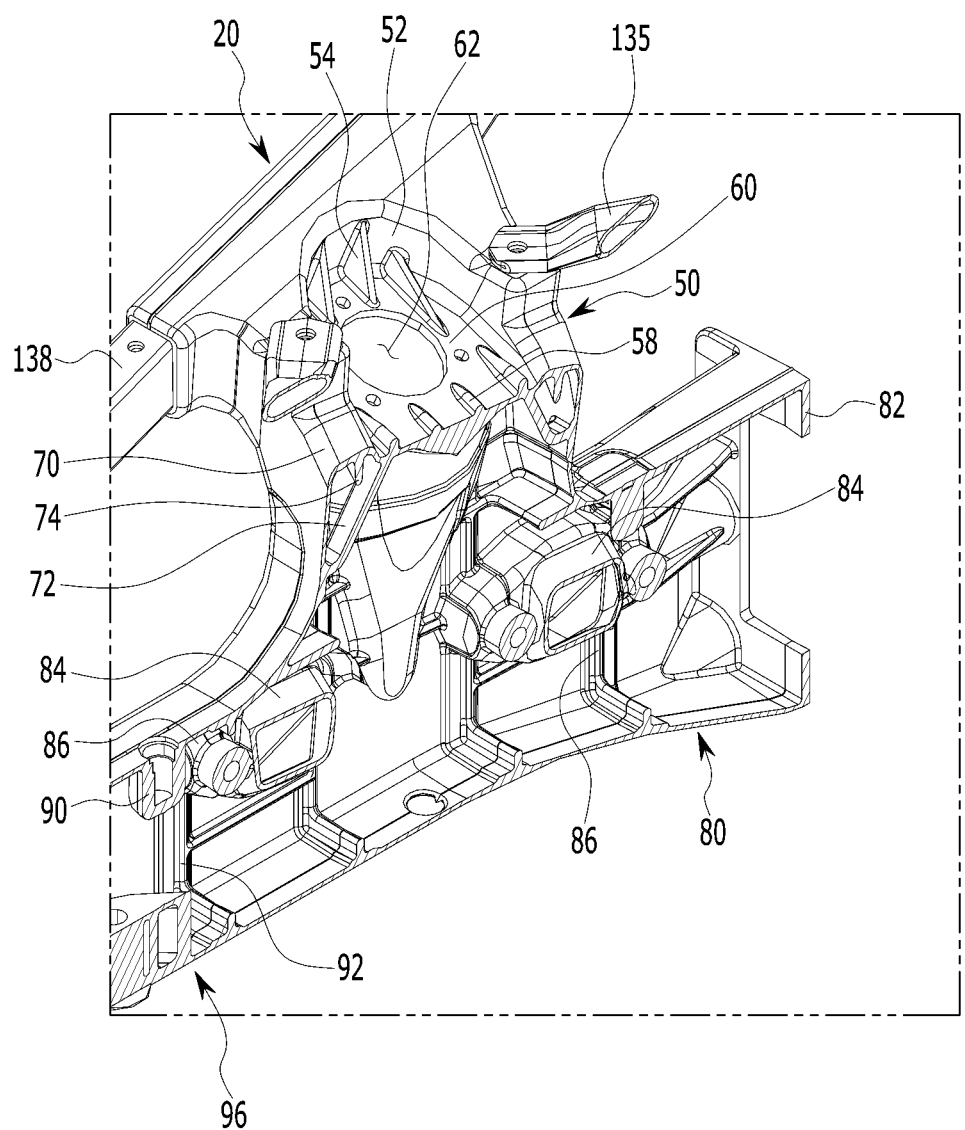
FIG. 7 is a cross-sectional view along the line VII-VII in FIG. 1.
Figure 8:
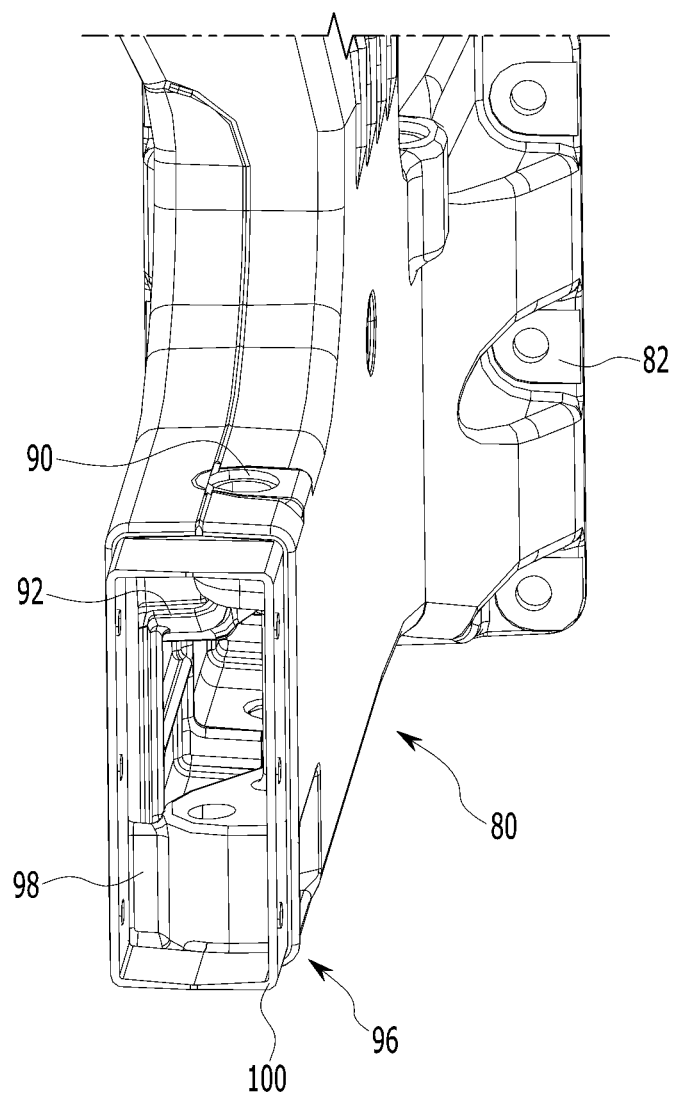
FIG. 8 is a partial perspective view showing a front side member of the front vehicle body structure according to various exemplary embodiments of the present disclosure.

FIG. 6 is a perspective view showing a front side member of the front vehicle body structure according to various exemplary embodiments of the present disclosure, FIG. 7 is a cross-sectional view along the line VII-VII in FIG. 1, and FIG. 8 is a partial perspective view showing a front side member of the front vehicle body structure according to various exemplary embodiments of the present disclosure.

Referring to FIG. 1 to FIG. 8, the front side member 80 may include a cabin mounting lower portion 82 integrally formed at a rear thereof.

Through the cabin mounting lower portion 82, the vehicle body cabin or dash panel may be easily mounted without a separate mounting bracket, etc., so that the number of parts and weight of the front vehicle body structure 10 may be reduced.

The front side member 80 may include a suspension arm mounting portion 84 formed integrally with the inside concave.

Because the suspension arm 141 may be mounted to the suspension arm mounting portion 84 without a separate mounting bracket, the number and weight of the front body structure 10 may be reduced.

The front body structure 10 according to various exemplary embodiments of the present disclosure may further include a suspension arm mounting portion reinforcement rib 86 integrally formed inside the front side member 80 adjacent to the suspension arm mounting portion 84.

The suspension arm mounting portion reinforcement rib 86 may be formed adjacent to the suspension arm mounting portion 84 to secure strength against the road load transmitted from the suspension arm 141.

The front side member 80 may further include an integrally formed powertrain mounting portion 90.

A powertrain or Power Electric (PE) module or a battery may be mounted on the powertrain mounting portion 90, reducing the number of parts and weight of the front vehicle body structure 10.

The front vehicle body structure 10 according to various exemplary embodiments of the present disclosure may further include a powertrain mounting reinforcement rib 92 integrally formed inside the front side member 80 adjacent to the powertrain mounting portion 90.

The integrally formed powertrain mounting reinforcement rib 92 may increase the strength of the powertrain mounting portion 90.

For example, the powertrain mounting portion 90 may be in a form of a bolt hole to which a bolt is coupled, and the powertrain mounting reinforcement rib 92 may be connected to the powertrain mounting portion 90.

The front side member 80 may further include an integrally formed sub-frame mounting portion 96 concave inwardly.

The front vehicle body structure 10 according to various exemplary embodiments of the present disclosure may further include a sub-frame mounting reinforcement rib 98 integrally formed inside the front side member 80 adjacent to the sub-frame mounting portion 96.

For example, the sub-frame mounting portion 96 may be assembled with a mounting bolt, and the integrally formed sub-frame mounting reinforcement rib 98 may increase the strength of the sub-frame mounting portion 96.

Figure 9:
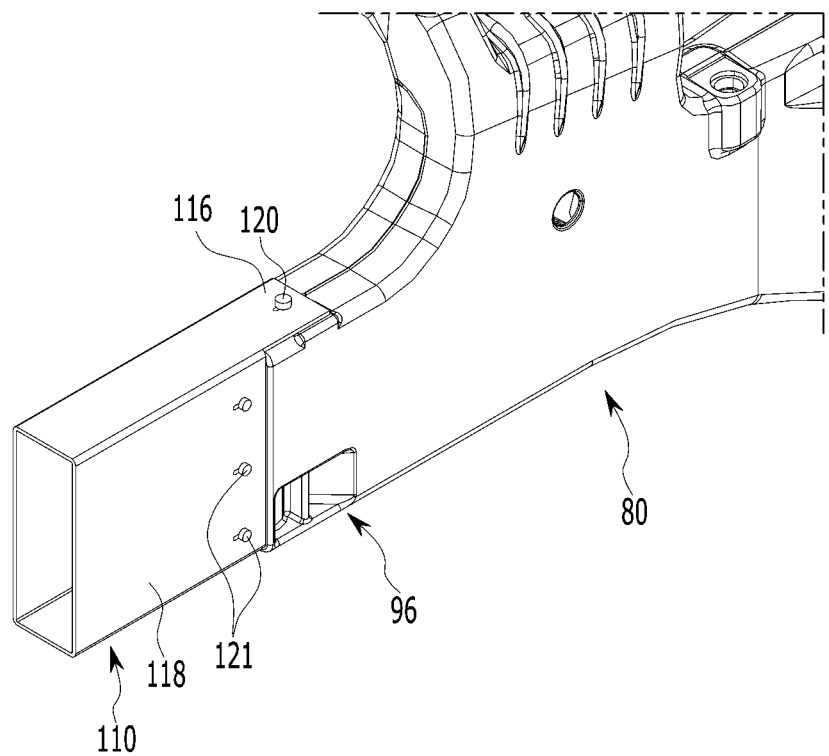
FIG. 9 is a partial perspective view showing a front side member and a front member of the front vehicle body structure according to various exemplary embodiments of the present disclosure.
Figure 10:
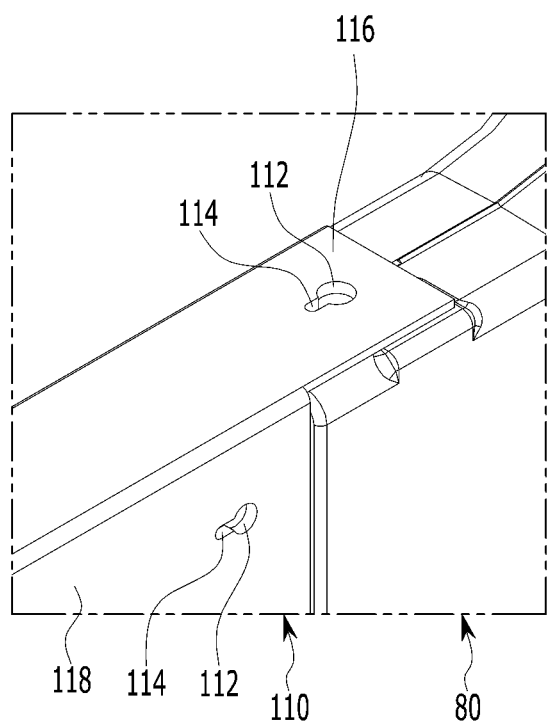
FIG. 10 is a partial perspective view showing a connection of a front side member and a front member of the front vehicle body structure according to various exemplary embodiments of the present disclosure.
Figure 11A:
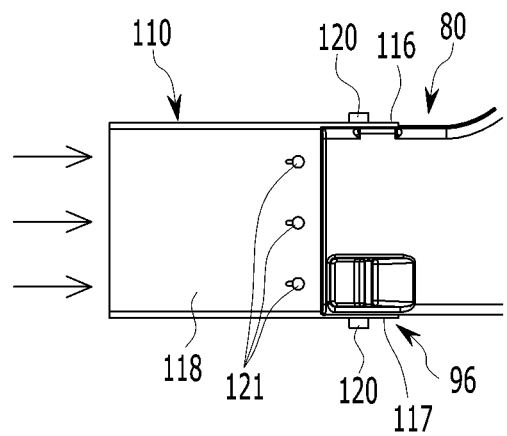
FIG. 11A, FIG. 11B and FIG. 11C are drawings showing a damage process during a frontal collision of a front side member and a front member of the front vehicle body structure according to various exemplary embodiments of the present disclosure.
Figure 11B:
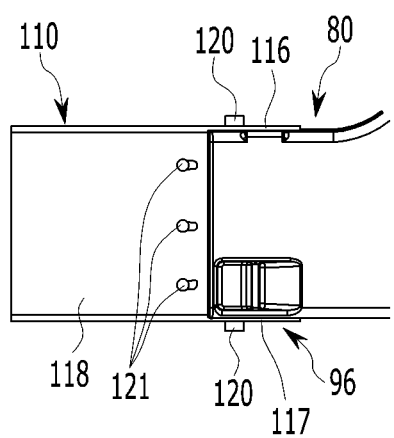
Figure 11C:
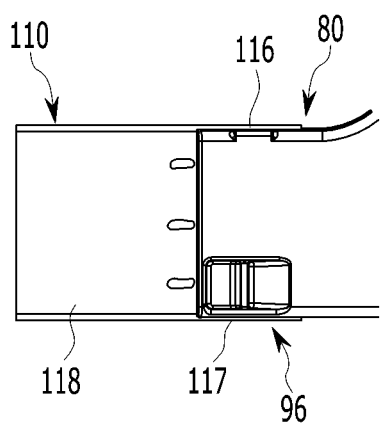

FIG. 9 is a partial perspective view showing a front side member and a front member of the front vehicle body structure according to various exemplary embodiments of the present disclosure, FIG. 10 is a partial perspective view showing a connection of a front side member and a front member of the front vehicle body structure according to various exemplary embodiments of the present disclosure, and FIG. 11A, FIG. 11B and FIG. 11C is a drawing showing a damage process during a frontal collision of a front side member and a front member of the front vehicle body structure according to various exemplary embodiments of the present disclosure.

Referring to FIG. 9, FIG. 10, FIG. 11A, FIG. 11B and FIG. 11C, the front vehicle body structure 10 according to various exemplary embodiments of the present disclosure may further include a front side member front mounting portion 100 integrally formed in front of the front side member 80.

The front vehicle body structure 10 according to various exemplary embodiments of the present disclosure may further include a front member 110 connected to the front side member front mounting portion 100.

The front member 110 may be mounted on the front side member front mounting portion 100 without a separate mounting bracket, etc., so that the number of parts and weight of the front vehicle body structure 10 may be reduced.

Referring to FIG. 1, a bumper beam 130 and Front End Module (FEM) 132 may be mounted on the front member 110.

Referring to FIG. 10 and referring to FIG. 11A, FIG. 11B and FIG. 11C, a bolt hole 112 may be formed in the front member 110, and a notch hole 114 smaller than the bolt hole 112 may be formed in front of the bolt hole 112.

The front member 110 may be formed of, for example, a simple structure including a rectangular cross-section shape.

That is, the front member 110 may include a front member side surface 118 and a front member upper surface 116 and a front member lower surface 117 formed on the upper and lower portions of the front member side surface 118 respectively extending rearward than the front member side surface 118.

And upper and lower mounting bolts 120 are respectively connected to the bolt holes 112 formed in the front member upper surface 116 and the front member lower surface 117, respectively, and the upper and lower mounting bolts 120 are respectively connected to the powertrain mounting portion 90 and the sub-frame mounting portion 96.

Through this, the number of portions and the entire weight for mounting the front member 110 may be reduced.

The side mounting bolt 121 is connected to the bolt hole 112 formed on the front member side surface 118, so that the front member 110 and the front side member 80 may be connected.

In the event of a front collision of the vehicle, an impact load transmitted from the bumper beam 130 may be transmitted to the front side member 80 through the front member 110.

Referring to FIG. 10, FIG. 11A, FIG. 11B and FIG. 11C, the notch hole 114 is crushed by the bolts 120 and 121 and then the bolts 120 and 121 may be broken when the vehicle collides forward thereof.

That is, as shown in FIG. 11A, when a vehicle front collision situation occurs, as shown in FIG. 11B, the notch hole 114 is distorted by the respective bolts 120, and 121, and accordingly, as shown in FIG. 11C, each of the bolts 120, and 121 may be broken.

Through this, it is possible to delay the time when the impact load transmitted from the bumper beam 130 is transmitted to the front side member 80 through the front member 110 during a front collision of the vehicle, and the notch hole 114 is crushed and the bolts 120 and 121 are broken, so that the impact load may be reduced.

Through this, it is possible to reduce the damage of the front side member 80.

As described above, according to the front vehicle body structure according to various exemplary embodiments of the present disclosure, it is possible to minimize the number of parts.

According to the front vehicle body structure according to various exemplary embodiments of the present disclosure, it is possible to secure cost competitiveness of a small-volume production vehicle type by use of a sand mold casting method.

According to the front vehicle body structure according to various exemplary embodiments of the present disclosure, it is possible to implement a high strength vehicle body structure.

Furthermore, according to the front vehicle body structure according to various exemplary embodiments of the present disclosure, it is possible to minimize the assemble connection structure between the parts, and to simultaneously assemble several peripheral parts, and to simplify the layout.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A front vehicle body structure comprising:
a fender apron upper member;
a shock absorber housing disposed under the fender apron upper member; and
a front side member disposed under the shock absorber housing,
wherein the fender apron upper member, the shock absorber housing and the front side member are integrally formed,
wherein the front side member includes a suspension arm mounting portion formed integrally with an inside concave.

2. The front vehicle body structure of claim 1, wherein the shock absorber housing includes:
a mounting upper connection connected to the fender apron upper member;
a mounting lower connection connected to the front side member; and
a shock absorber mounting portion connected to the mounting upper connection and the mounting lower connection, wherein the shock absorber mounting portion includes a shock absorber mounting hole.

3. The front vehicle body structure of claim 2, wherein the shock absorber housing further includes a mounting portion upper reinforcement rib integrally formed around the shock absorber mounting hole connecting the mounting upper connection and the shock absorber mounting portion.

4. A front vehicle body structure comprising:
a fender apron upper member;
a shock absorber housing disposed under the fender apron upper member; and
a front side member disposed under the shock absorber housing,
wherein the fender apron upper member, the shock absorber housing and the front side member are integrally formed,
wherein the shock absorber housing includes:
a mounting upper connection connected to the fender apron upper member;
a mounting lower connection connected to the front side member; and
a shock absorber mounting portion connected to the mounting upper connection and the mounting lower connection, wherein the shock absorber mounting portion includes a shock absorber mounting hole,
wherein the shock absorber housing further includes a mounting portion upper reinforcement rib integrally formed around the shock absorber mounting hole connecting the mounting upper connection and the shock absorber mounting portion, and
wherein the fender apron upper member includes a fender apron reinforcement rib integrally formed inside the fender apron upper member to be connected to the mounting portion upper reinforcement rib.

5. The front vehicle body structure of claim 3, wherein the shock absorber housing further includes a mounting portion lower reinforcement rib connecting the mounting lower connection and the shock absorber mounting portion and formed around the shock absorber mounting hole.

6. A front vehicle body structure comprising:
a fender apron upper member;
a shock absorber housing disposed under the fender apron upper member; and
a front side member disposed under the shock absorber housing,
wherein the fender apron upper member, the shock absorber housing and the front side member are integrally formed;
wherein the shock absorber housing includes:
a mounting upper connection connected to the fender apron upper member;
a mounting lower connection connected to the front side member; and
wherein a shock absorber mounting portion is connected to the mounting upper connection and the mounting lower connection, and includes a shock absorber mounting hole, and
wherein an inclined connection extends from the fender apron upper member to the front side member and protruding protrudes around the shock absorber mounting portion.

7. The front vehicle body structure of claim 6, further including an inclined connection hollow side integrally formed inside the inclined connection to form an inclined connection closed cross-section.

8. The front vehicle body structure of claim 7, further including an inclined connection reinforcement rib formed in a direction of the front side member from the fender apron upper member inside the inclined connection.

9. The front vehicle body structure of claim 6, further including a strut bar mounting portion integrally formed on the inclined connection.

10. The front vehicle body structure of claim 1, wherein the front side member includes a cabin mounting lower portion integrally formed at a rear of the front side member.

11. The front vehicle body structure of claim 1, further including a suspension arm mounting portion reinforcement rib integrally formed inside the front side member adjacent to the suspension arm mounting portion.

12. The front vehicle body structure of claim 1, wherein the front side member includes a powertrain mounting portion integrally formed to the front side member.

13. The front vehicle body structure of claim 12, further including a powertrain mounting reinforcement rib integrally formed inside the front side member adjacent to the powertrain mounting portion.

14. The front vehicle body structure of claim 1, wherein the front side member includes an integrally formed sub-frame mounting portion concave inwardly.

15. The front vehicle body structure of claim 14, further including a sub-frame mounting reinforcement rib integrally formed inside the front side member adjacent to the sub-frame mounting portion.

16. The front vehicle body structure of claim 1, further including a front side member front mounting portion integrally formed in front of the front side member.

17. The front vehicle body structure of claim 16, further including:
a front member connected to the front side member front mounting portion,
wherein a bolt hole is formed in the front member, and a notch hole smaller than the bolt hole is formed in front of the bolt hole.

18. The front vehicle body structure of claim 1, wherein the fender apron upper member includes:
a fender apron upper front member mounting portion integrally formed in front of the fender apron upper member; and
a cabin mounting upper portion integrally formed in a rear of the fender apron upper member.

* * * * *